United States Patent
Deguchi

(10) Patent No.: US 8,729,878 B2
(45) Date of Patent: May 20, 2014

(54) SWITCHING REGULATOR CONTROL CIRCUIT AND SWITCHING REGULATOR

(75) Inventor: Michiyasu Deguchi, Chiba (JP)

(73) Assignee: Seiko Instruments Inc., Chiba (JP)

(*) Notice: Subject to any disclaimer, the term of this patent is extended or adjusted under 35 U.S.C. 154(b) by 355 days.

(21) Appl. No.: 13/357,030

(22) Filed: Jan. 24, 2012

(65) Prior Publication Data

US 2012/0194154 A1    Aug. 2, 2012

(30) Foreign Application Priority Data

Feb. 1, 2011   (JP) ................................. 2011-019640

(51) Int. Cl.
    *G05F 1/40*           (2006.01)

(52) U.S. Cl.
    USPC ........................................................ 323/282

(58) Field of Classification Search
    USPC ......... 323/265, 269, 273, 280, 282–285, 351; 361/87, 93.1

See application file for complete search history.

(56) References Cited

U.S. PATENT DOCUMENTS

| | | | | |
|---|---|---|---|---|
| 6,127,815 A * | 10/2000 | Wilcox | ......................... | 323/282 |
| 6,737,843 B2 * | 5/2004 | Kanakubo et al. | ............ | 323/282 |
| 7,498,785 B2 * | 3/2009 | Shimizu et al. | ............... | 323/282 |
| 7,831,851 B2 * | 11/2010 | Yoshii | ............................ | 713/324 |
| 7,868,602 B2 * | 1/2011 | Omi et al. | ...................... | 323/284 |
| 8,207,721 B2 * | 6/2012 | Sohma | ......................... | 323/282 |
| 8,295,020 B2 * | 10/2012 | Oki | ................................ | 361/87 |
| 8,368,475 B2 * | 2/2013 | Nakada et al. | ................ | 331/111 |
| 8,446,136 B2 * | 5/2013 | Schindler | ...................... | 323/282 |
| 8,629,667 B2 * | 1/2014 | Paillet et al. | ................... | 323/282 |

FOREIGN PATENT DOCUMENTS

JP           03-052556 A       3/1991

* cited by examiner

*Primary Examiner* — Adolf Berhane
(74) *Attorney, Agent, or Firm* — Brinks Gilson & Lione

(57) ABSTRACT

Provided is a switching regulator including an overload protection circuit, which has high accuracy even without requiring adjusting means in a test step. The switching regulator includes: a first triangle wave generation circuit for generating a first triangle wave which controls Duty of a PWM signal; and a second triangle wave generation circuit for generating a second triangle wave for overload detection, which has a crest value smaller than that of the first triangle wave. A ratio between the crest value of the first triangle wave and the crest value of the second triangle wave is set based on respective capacitances or constant currents thereof.

5 Claims, 4 Drawing Sheets

SWITCHING REGULATOR CONTROL CIRCUIT AND SWITCHING REGULATOR

RELATED APPLICATIONS

This application claims priority under 35 U.S.C. §119 to Japanese Patent Application No. 2011-019640 filed on Feb. 1, 2011, the entire content of which is hereby incorporated by reference.

BACKGROUND OF THE INVENTION

1. Field of the Invention

The present invention relates to a switching regulator for outputting a constant voltage, and more particularly, to an overload protection circuit for interrupting current supply to an output to protect a circuit when an overcurrent flows to an output terminal.

2. Description of the Related Art

Switching regulators are used as voltage supply sources of various electronic device circuits. The switching regulator functions so as to output a constant voltage to an output terminal regardless of voltage fluctuations of an input terminal. In addition, the switching regulator also has an important function of overload protection performed by interrupting current supply for protection of a circuit when a current to be supplied from the output terminal to a load dramatically increases and exceeds the maximum current.

FIG. 5 is a block diagram of a switching regulator control circuit including an overload protection circuit.

The conventional switching regulator control circuit includes a triangle wave oscillator 1, an error amplifier 2, a PWM comparator 3, an error amplifier output detection circuit 4, a timer circuit 5, a gate circuit 6, a reference voltage circuit 7, and a buffer circuit 8.

The reference voltage circuit 7 outputs a reference voltage Vref. The triangle wave oscillator 1 outputs a triangle wave Vramp oscillating between an upper-limit level VH and a lower-limit level VL. The error amplifier 2 compares a feedback voltage Vfb of an output voltage Vout of the switching regulator and the reference voltage Vref, and amplifies a difference voltage. The PWM comparator 3 compares an output voltage Verr of the error amplifier 2 and the triangle wave Vramp, and outputs a PWM signal Vpwm. The gate circuit 6 controls the output of the PWM signal Vpwm. The buffer circuit 8 power-amplifies the output of the gate circuit 6, and outputs the amplified signal to a driver transistor (not shown). The error amplifier output detection circuit 4 monitors the output voltage Verr of the error amplifier 2. The timer circuit 5 starts its counting operation based on output results of the error amplifier output detection circuit 4.

Here, the error amplifier output detection circuit 4 includes a reference voltage circuit for outputting a reference voltage Vref2 (>VH), and a comparator for comparing the output voltage Verr of the error amplifier 2 and the reference voltage Vref2. When Verr>Vref2 is satisfied, the comparator outputs an overload state detecting signal to the timer circuit 5. With this, the timer circuit 5 starts its counting operation, and after a predetermined time period has elapsed, the overload state detecting signal is output to the gate circuit 6. In response to this, the gate circuit 6 controls the driver transistor so as to be non-conductive. In this manner, the output voltage Vout drops to 0 V, and the difference voltage between the reference voltage Vref and the feedback voltage Vfb increases, to thereby maintain the relationship of Verr>Vref2. Thus, the driver transistor continuously maintains the non-conductive state (see, for example, Japanese Patent Application Laid-open No. 03-52556). FIG. 6 illustrates a timing chart of an operation of the conventional switching regulator control circuit.

As described above, the overload protection circuit of the conventional switching regulator control circuit prevents thermal breakage of an output transistor due to the overload.

However, in a case of a relatively small overload, the change amount of the output voltage Verr of the error amplifier 2 is small, and hence the output voltage Verr does not exceed the reference voltage Vref2 in some cases. Therefore, it is demanded to lower a set value of the reference voltage Vref2 to detect the overload with a smaller output current Iout. In view of this, the set value of the reference voltage Vref2 is set to a voltage (VH>) slightly larger than Verr(max).

However, in order to obtain a reference voltage Vref2' slightly larger than Verr(max), adjusting means for correcting manufacturing fluctuations is necessary because the manufacturing fluctuations of the upper-limit level VH and the lower-limit level VL of the triangle wave Vramp cause a serious trouble. Further, in order to correct the manufacturing fluctuations, it is also necessary to measure the upper-limit level VH and the lower-limit level VL of the triangle wave Vramp corresponding to a voltage at an internal node of an integrated circuit (IC).

SUMMARY OF THE INVENTION

The present invention has been made to solve the above-mentioned problems, and has an object to set Duty of overload detection with a simple circuit and high accuracy without performing a correction step for manufacturing fluctuations.

In order to solve the conventional problems, a switching regulator control circuit including an overload protection circuit according to the present invention has the following structure.

A switching regulator control circuit, including: an error amplifying circuit for amplifying a difference voltage between a reference voltage and a divided voltage obtained by dividing an output voltage output from a switching regulator; a first triangle wave generation circuit for outputting a first triangle wave; a first comparator for comparing an output voltage of the error amplifying circuit and the first triangle wave; a second triangle wave generation circuit for outputting a second triangle wave having a crest value smaller than a crest value of the first triangle wave; a second comparator for comparing the output voltage of the error amplifying circuit and the second triangle wave; and a determination circuit for detecting an overload state based on an output signal of the second comparator, in which a difference between the crest value of the first triangle wave and the crest value of the second triangle wave is set based on a characteristic ratio between a device forming the first triangle wave generation circuit and a device forming the second triangle wave generation circuit.

According to the switching regulator control circuit including the overload protection circuit of the present invention, Duty of overload detection in PWM control is determined based on a rate of an amplitude value Vramp2 of the second triangle wave Ramp2 with respect to an amplitude value Vramp1 of the first triangle wave Ramp1. That is, Duty of detection is determined by Vramp2/Vramp1. It is well-known that, in a semiconductor integrated circuit, obtaining a voltage absolute value with high accuracy is difficult in many cases, but obtaining the ratio with high accuracy is relatively easy. Thus, it is possible to suppress manufacturing fluctuations of Duty of detection as much as possible, and there is an effect that a step required for correction of the fluctuations, such as trimming, becomes unnecessary.

DETAILED DESCRIPTION OF THE PREFERRED EMBODIMENT

Figure 1:
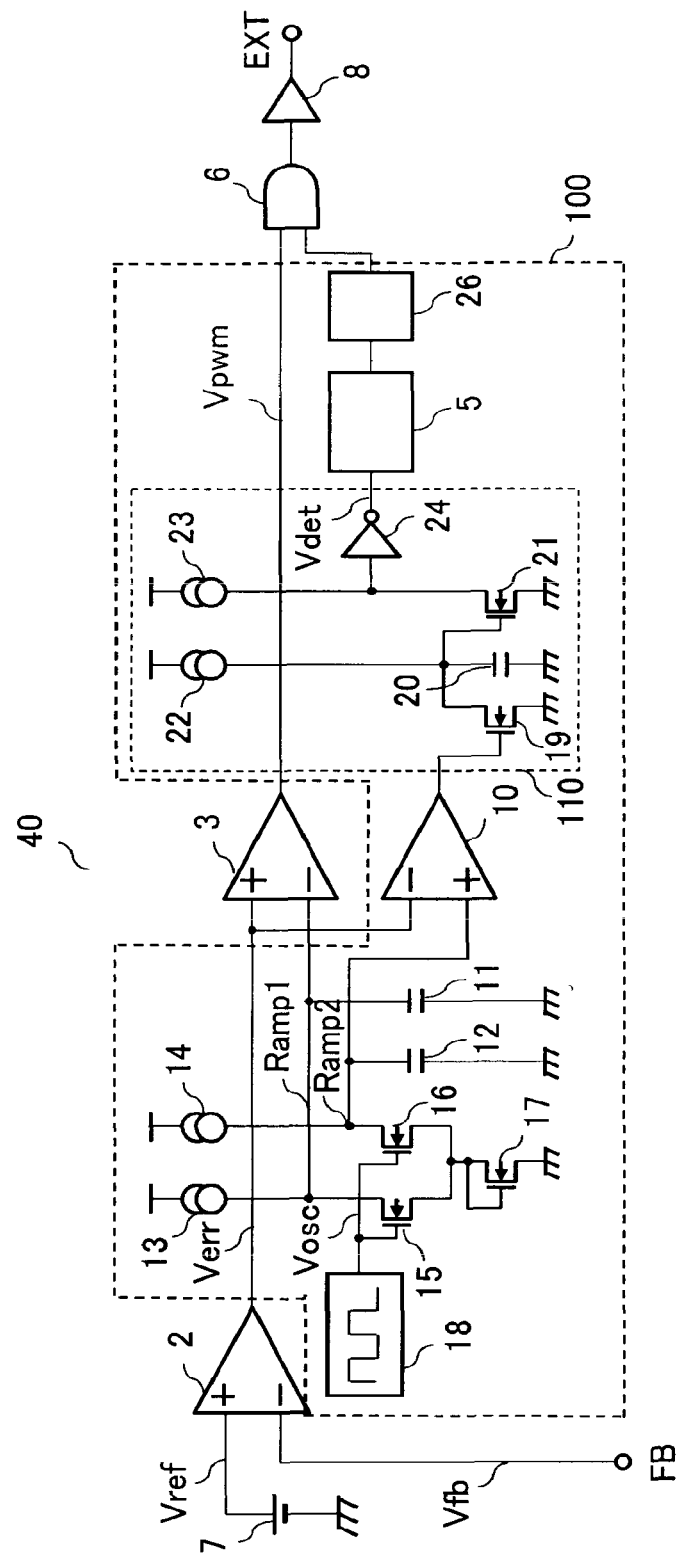
FIG. 1 is a block diagram of a switching regulator control circuit including an overload protection circuit according to an embodiment of the present invention.
Figure 2:
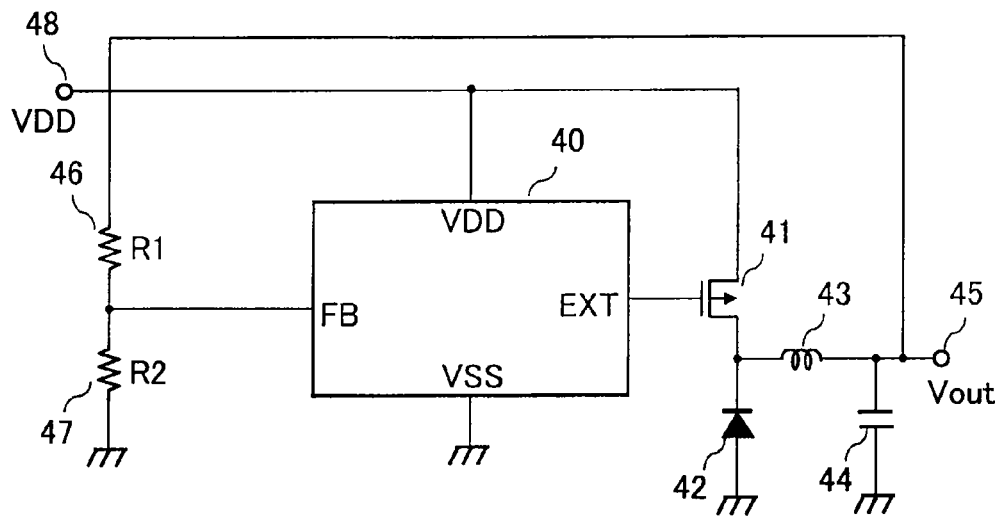
FIG. 2 is a block diagram illustrating an example of a switching regulator including the switching regulator control circuit according to the embodiment of the present invention.

FIG. 1 is a block diagram of a switching regulator control circuit including an overload protection circuit according to an embodiment of the present invention. FIG. 2 is a block diagram illustrating an example of a switching regulator including the switching regulator control circuit according to this embodiment. As an example, the block diagram of FIG. 2 illustrates a step-down switching regulator.

The switching regulator illustrated in FIG. 2 includes a switching regulator control circuit 40, a driver transistor 41, a diode 42, a coil 43, an output capacitor 44, output voltage dividing resistors 46 and 47, a power supply terminal 48, and an output terminal 45.

The switching regulator control circuit 40 illustrated in FIG. 1 includes an error amplifier 2, a reference voltage circuit 7, a rectangular wave oscillation circuit 18, a first triangle wave (Ramp1) generation circuit, a first comparator 3, an overload protection circuit 100, a gate circuit 6, and a buffer circuit 8. The first triangle wave (Ramp1) generation circuit includes a constant current source 13, a capacitor 11, switching means 15, and a level-shift circuit 17.

The overload protection circuit 100 includes a second triangle wave (Ramp2) generation circuit, a second comparator 10, a determination circuit 110, a timer circuit 5, and a latch circuit 26. The second triangle wave (Ramp2) generation circuit includes a constant current source 14, a capacitor 12, switching means 16, and the level-shift circuit 17. The determination circuit 110 includes switching means 19 and 21, a capacitor 20, constant current sources 22 and 23, and an inverter 24.

A feedback voltage Vfb input to a voltage feedback terminal FB is a voltage obtained by dividing an output voltage Vout of the output terminal 45. The error amplifier 2 compares a reference voltage Vref of the reference voltage circuit 7 and the feedback voltage Vfb, and then outputs an error voltage Verr. The comparator 3 compares the error voltage Verr and a first triangle wave Ramp1 output from the first triangle wave generation circuit, and then outputs a signal Vpwm. That is, with the increase and decrease of the error voltage Verr of the error amplifier, a pulse width of the signal Vpwm output from the comparator 3 is controlled. The switching regulator controls the ON/OFF time period of a switching device (for example, driver transistor 41) in accordance with this pulse width. This control corresponds to a so-called pulse width modulation (PWM) control of the switching regulator.

The feedback voltage Vfb is input to an inverting input terminal of the error amplifier 2, and the reference voltage Vref is input to a non-inverting input terminal of the error amplifier 2. Therefore, when a load current increases and the output voltage Vout decreases, the output voltage Verr increases. The output voltage Verr of the error amplifier 2 is input to a non-inverting input terminal of the comparator 3, and the first triangle wave Ramp1 is input to an inverting input terminal of the comparator 3. Therefore, as the output voltage Verr of the error amplifier 2 increases, the H-level period of the signal Vpwm output from the comparator 3 becomes longer. The same applies also in a case where the inputs of each of the error amplifier 2 and the comparator 3 are inverted.

Figure 3:
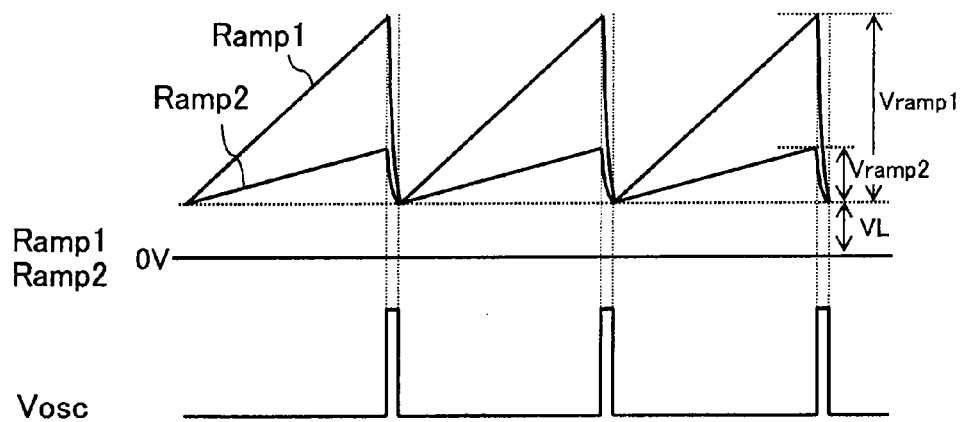
FIG. 3 is a waveform chart illustrating first and second triangle waves according to the embodiment of the present invention.
Figure 4:
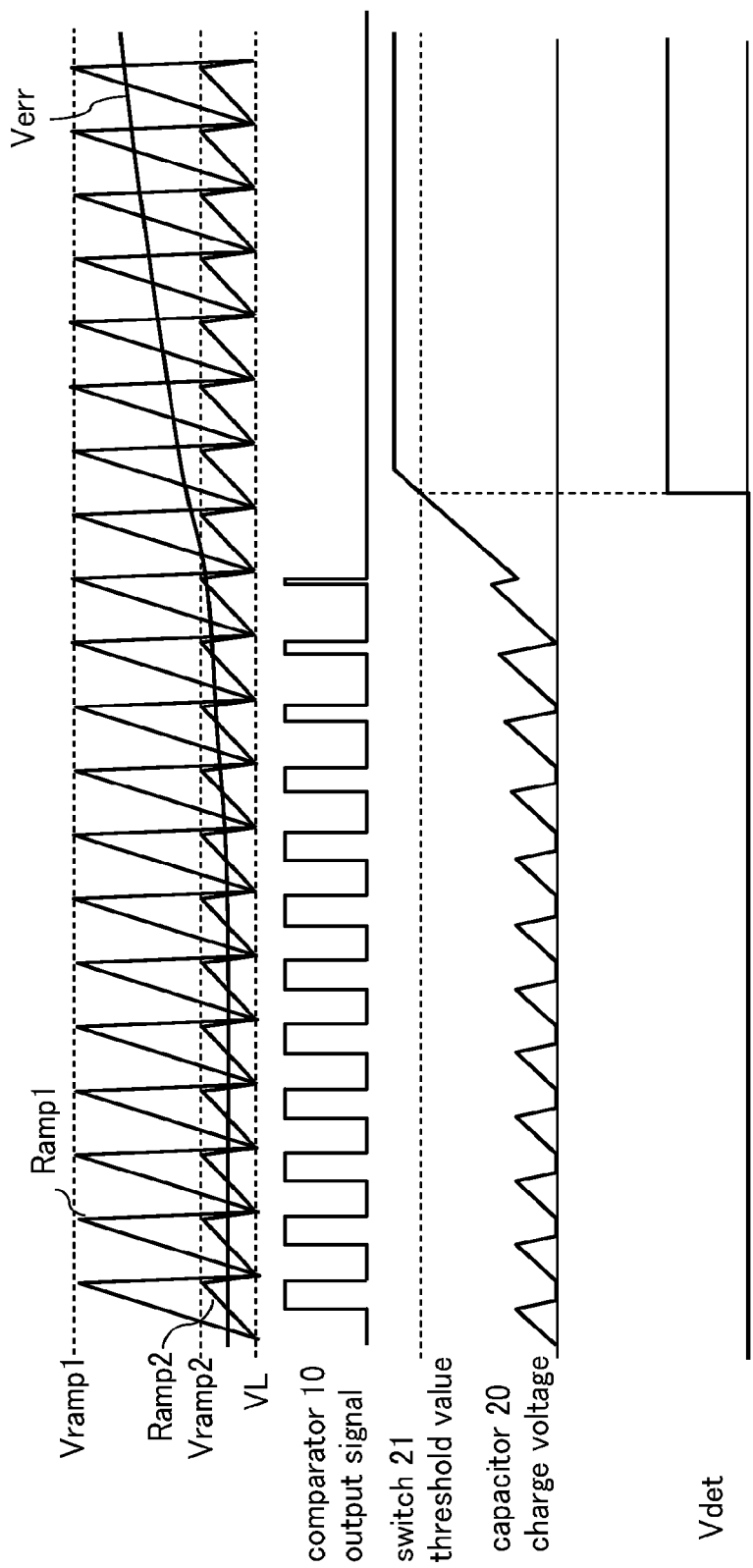
FIG. 4 is a timing chart illustrating an operation of the switching regulator control circuit according to the embodiment of the present invention.
Figure 5:
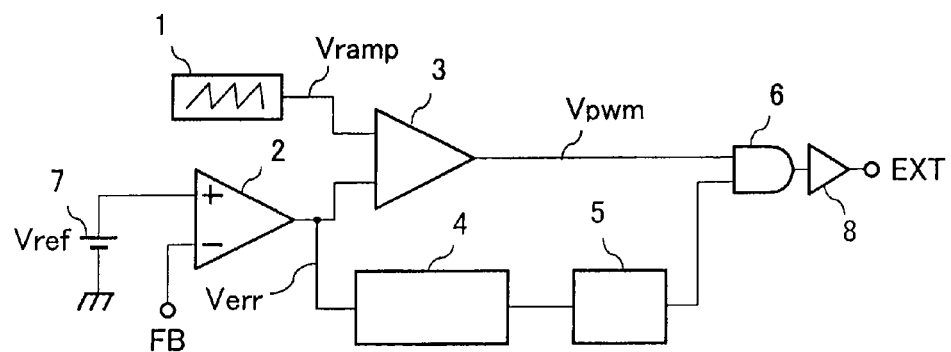
FIG. 5 is a block diagram of a conventional switching regulator control circuit including an overload protection circuit.
Figure 6:
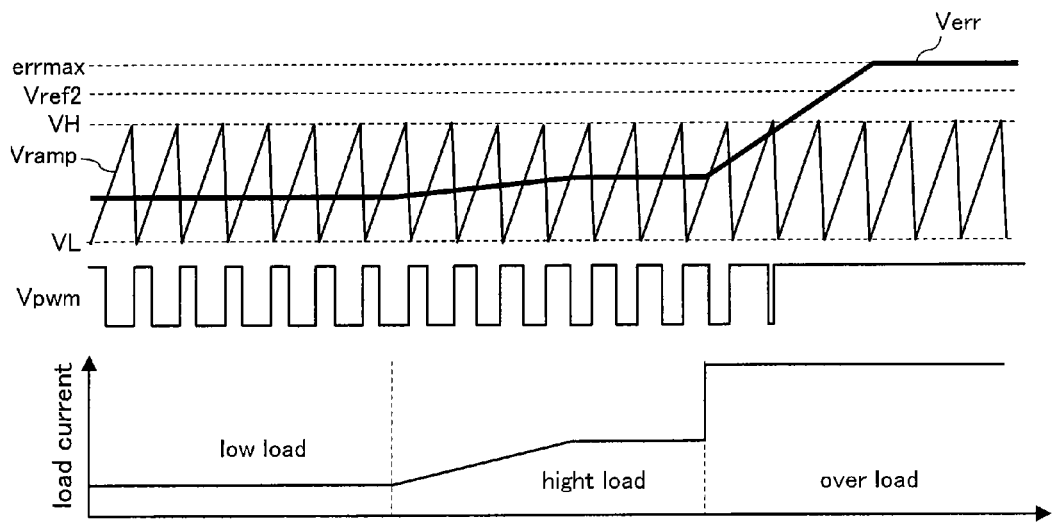
FIG. 6 is a timing chart illustrating an operation of the conventional switching regulator control circuit.

Next, with reference to waveform charts of FIGS. 3 and 4, an operation of the switching regulator control circuit 40 is described. In the following description, a rate of an H-level period with respect to an oscillation period T of the first triangle wave Ramp 1 is defined as a duty factor (Duty). That is, Duty represents a rate of a conduction time period of the driver transistor 41 with respect to the oscillation period T.

FIG. 3 is a waveform chart illustrating the first and second triangle waves according to this embodiment.

An output signal Vosc of the rectangular wave oscillation circuit 18 controls the conduction/non-conduction of the switching means 15 and 16. When the switching means 15 and 16 are in the non-conductive state, the capacitors 11 and 12 are respectively charged by the constant current sources 13 and 14, and potentials of the first triangle wave Ramp 1 and the second triangle wave Ramp2 increase at a predetermined rate. When the switching means 15 and 16 are in the conductive state, charges of the capacitors 11 and 12 are discharged, and the potentials of the first triangle wave Ramp1 and the second triangle wave Ramp2 decrease. The second triangle wave Ramp2 is a triangle wave having a crest value smaller than that of the first triangle wave Ramp1. When the constant current sources 13 and 14 provide an equal current value, the crest values of the triangle waves are determined based on a capacitance ratio between the capacitors 11 and 12. When Vramp1 represents an upper-limit voltage of the first triangle wave Ramp1, Vramp2 represents an upper-limit voltage of the second triangle wave Ramp2, C11 represents a capacitance value of the capacitor 11, and C12 represents a capacitance value of the capacitor 12, the relationship is expressed by the following expression (1).

$$V\text{ramp}2/V\text{ramp}1 = C11/C12 \tag{1}$$

The level-shift circuit 17 increases the lower-limit value of the voltages of the first triangle wave Ramp1 and the second triangle wave Ramp2 from GND to VL (V). The level-shift circuit 17 sets the lower-limit value of the voltages of the first triangle wave Ramp1 and the second triangle wave Ramp2 so as to be larger than the output lower-limit voltage of the error amplifier 2. Therefore, depending on the output lower-limit voltage of the error amplifier 2, the level-shift circuit 17 may be omitted.

The first triangle wave generation circuit and the second triangle wave generation circuit operate as described above, and the waveform of the first triangle wave Ramp1 and the waveform of the second triangle wave Ramp2 are each formed into a triangle wave as illustrated in FIG. 3.

Here, Duty in the PWM operation of the switching regulator control circuit 40 has the largest dependency on a power supply voltage VDD and the output voltage Vout. The step-down switching regulator illustrated as an example in FIG. 2 has Duty of Vout/VDD. However, voltage drop occurs at the driver transistor 41 and the diode 42 due to a load current, and thus the effective power supply voltage VDD reduces. Therefore, actually, due to the increase in load current, Duty also slightly and gradually increases. In the switching regulator control circuit 40 illustrated in FIG. 1, due to the increase in load current, the output voltage Verr of the error amplifier 2 increases, and thus Duty increases. Therefore, it is only necessary to detect the overload state when the value of the output voltage Verr of the error amplifier 2 reaches a specified value.

Next, the operation of the overload protection circuit 100 is described with reference to FIG. 4.

The output voltage Verr of the error amplifier 2 is input to an inverting input terminal of the comparator 10, and the second triangle wave Ramp2 is input to a non-inverting input terminal of the comparator 10. When the output voltage Verr of the error amplifier 2 is between the lower-limit voltage VL and the upper-limit voltage Vramp2 of the second triangle wave Ramp2, the comparator 10 outputs a pulse signal. In accordance with the output signal of the comparator 10, the switching means 19 alternates between the conductive state and the non-conductive state. Therefore, the capacitor 20 alternates charging by the constant current source 22 and discharging by the switching means 19, and hence a charge voltage of the capacitor 20 does not exceed a predetermined value. When the output voltage Verr of the error amplifier 2 increases due to the load current increase and exceeds the upper-limit voltage Vramp2 of the second triangle wave Ramp2, the output of the comparator 10 maintains an L-level state. Therefore, the switching means 19 maintains a non-conductive state, and hence the capacitor 20 is charged by the constant current source 22. When the voltage of the capacitor 20 reaches a threshold value of the switching means 21, the determination circuit 110 outputs an overload detection signal Vdet.

The first triangle wave Ramp1 and the second triangle wave Ramp2 have the common lower-limit voltage VL, and hence Duty when the output voltage Verr is equal to the upper-limit voltage Vramp2 of the second triangle wave Ramp2, that is, Duty0, is represented by the following expression (2).

$$Duty0 = Vramp2/Vramp1 \quad (2)$$

This Duty0 corresponds to Duty of overload detection, and based on the expression (1), Duty0=C11/C12 is satisfied, that is, Duty0 of overload detection is determined based on the capacitance ratio between the capacitor 11 and the capacitor 12.

In semiconductor integrated circuit manufacturing, it is easy to provide ratios, such as a resistance ratio and a capacitance ratio, within a small fluctuation range. Therefore, in a case where the present invention is provided inside the semiconductor integrated circuit, it is possible to obtain Duty of overload detection with very high accuracy without requiring adjusting means in a test step.

Note that, a crest ratio between the first triangle wave Ramp1 and the second triangle wave Ramp2 can be obtained based on a current ratio between the constant current sources 13 and 14 by setting the capacitors 11 and 12 to have the same value. When I13 represents a current of the constant current source 13, I14 represents a current of the constant current source 14, C represents a capacitance value of the capacitors 11 and 12, and t represents a charge time period, the crest values of the first triangle wave Ramp1 and the second triangle wave Ramp2 are represented by the following expressions (3) and (4).

$$Vramp1 = I13t/C \quad (3)$$

$$Vramp2 = I14t/C \quad (4)$$

Therefore, the ratio between the crest values of the first triangle wave Ramp1 and the second triangle wave Ramp2 is represented by the following expression (5).

$$Vramp2/Vramp1 = I2/I1 \quad (5)$$

As understood from above, it is only required to set the current ratio between I13 and I14 so as to correspond to Duty of overload detection.

Further, the switching regulator control circuit 40 can be attained even when the logic is inverted. In this case, the waveforms illustrated in the timing charts of FIGS. 3 and 4 are inverted in accordance with the circuit.

As described above, according to the switching regulator control circuit including the overload protection circuit of this embodiment, there is an effect that Duty of overload detection can be set/attained with high accuracy without the need of correcting manufacturing fluctuations by adjusting means in a test step.

What is claimed is:

1. A switching regulator control circuit, comprising:
   an error amplifying circuit for amplifying a difference voltage between a reference voltage and a divided voltage obtained by dividing an output voltage output from a switching regulator;
   a first triangle wave generation circuit for outputting a first triangle wave;
   a first comparator for comparing an output voltage of the error amplifying circuit and the first triangle wave;
   a second triangle wave generation circuit, which has the same circuit structure as the first triangle wave generation circuit, for outputting a second triangle wave having a crest value smaller than a crest value of the first triangle wave;
   a second comparator for comparing the output voltage of the error amplifying circuit and the second triangle wave; and
   a determination circuit for detecting an overload state based on an output signal of the second comparator,
   wherein a difference between the crest value of the first triangle wave and the crest value of the second triangle wave is set based on a characteristic ratio between a device corresponding to the first triangle wave generation circuit and a device corresponding to the second triangle wave generation circuit.

2. A switching regulator control circuit according to claim 1, further comprising a rectangular wave oscillation circuit for outputting a rectangular wave,
   wherein the first triangle wave generation circuit comprises:
   a first capacitor;
   a first constant current source for one of charging and discharging the first capacitor; and
   first switching means, which is controlled by the rectangular wave, for one of discharging and charging the first capacitor, and
   wherein the second triangle wave generation circuit comprises:
   a second capacitor;
   a second constant current source for one of charging and discharging the second capacitor; and
   second switching means, which is controlled by the rectangular wave, for one of discharging and charging the second capacitor.

3. A switching regulator control circuit according to claim 2, wherein a ratio between the crest value of the first triangle wave and the crest value of the second triangle wave is obtained based on a capacitance ratio between the first capacitor and the second capacitor.

4. A switching regulator control circuit according to claim 2, wherein a ratio between the crest value of the first triangle wave and the crest value of the second triangle wave is obtained based on a current ratio between the first constant current source and the second constant current source.

5. A switching regulator, comprising:
   an input terminal and an output terminal;
   an output transistor, a coil, a rectifying device, and an output capacitor, which are provided between the input terminal and the output terminal;
   a voltage dividing resistor for dividing a voltage of the output terminal; and
   the switching regulator control circuit according to claim 1, into which the voltage divided by the voltage dividing resistor is input, for controlling the output transistor so that the voltage of the output terminal is constant.

* * * * *